United States Patent [19]

Poteat et al.

[11] Patent Number: 4,688,885

[45] Date of Patent: Aug. 25, 1987

[54] LIGHTWAVE COMPONENT PACKAGE

[75] Inventors: Tommy L. Poteat, Bridgewater; William S. N. Trimmer, Belle Mead, both of N.J.

[73] Assignee: American Telephone and Telegraph Company, AT&T Bell Laboratories, Murray Hill, N.J.

[21] Appl. No.: 737,924

[22] Filed: May 28, 1985

[51] Int. Cl.[4] .......................... G02B 6/36; G02B 7/26
[52] U.S. Cl. ............................... 350/96.20; 350/96.21
[58] Field of Search ................ 350/96.15, 96.20, 96.21

[56] References Cited

U.S. PATENT DOCUMENTS

| 3,982,123 | 9/1976 | Goell et al. | 250/227 |
| 4,296,998 | 10/1981 | Dufft | 350/96.20 |
| 4,302,071 | 11/1981 | Winzer | 350/96.20 |
| 4,303,302 | 12/1981 | Ramsey et al. | 350/96.20 |
| 4,543,663 | 9/1985 | Laor | 350/96.15 |

FOREIGN PATENT DOCUMENTS 0071666 2/1983 European Pat. Off. .

OTHER PUBLICATIONS

Joyce et al; "Micro-Step Motor"; *J. of Scientific Instruments;* vol. 2, Series 2; 1969; pp. 661-663.
"Piezo Drive with Coarse and Fine Adjustment", *IBM Technical Disclosure Bulletin,* vol. 22, No. 7, Dec. 1979, pp. 2897-2898, G. Binnig et al.
"Tunneling Through a Controllable Vacuum Gap", *Applied Physics Letters,* vol. 40, No. 2, Jan. 1982, pp. 178-179, G. Binnig et al.
J. H. Bruning, "The Piezoelectric Worm—A Submicron Linear Positioning Device," *Proceedings of Fourth Annual Symposium on Incremental Motion Control Systems and Devices,* Apr. 1-3, 1975, pp. X-1 to X-11.
*Lasers & Applications,* Feb. 1985, p. 106.

*Primary Examiner*—Robert E. Wise
*Attorney, Agent, or Firm*—Lester H. Birnbaum

[57] ABSTRACT

Disclosed is a device which in one aspect effects a continuous realignment of the optical fiber in transmitters, receivers, or transceivers after the lightwave package is assembled and in use, and in another aspect provides movement of optical fibers or other small elements for general applications. In one embodiment, the fiber is mechanically coupled to a piezoelectric crystal which expands and contracts in response to electrical pulses supplied to electrodes on the crystal. Clamping and releasing the ends of the crystal by magnetic or electrostatic forces result in movement of the fiber in incremental steps to its aligned position.

7 Claims, 11 Drawing Figures

LIGHTWAVE COMPONENT PACKAGE

BACKGROUND OF THE INVENTION

This invention relates to accurate placement of small elements such as required in lightwave component packages and devices and, in particular, to a transmitter, receiver, transceiver, or light switch including an optical fiber which must be aligned with a light source, detector, or another fiber.

In present lightwave transmitters, a light source such as a laser or light-emitting diode (LED) is usually provided within a hermetic package with the light coupled out of the package through an optical fiber aligned with the source. Similarly, lightwave receivers include a light detector, such as a PIN diode, which receibes light from the outside through an optical fiber aligned with the detector. Transceivers include both a source and detector. In all these packages, proper alignment is critical in view of the extremely small dimensions of the fibers. For example, a single mode laser and single mode fiber typically must be aligned to a fraction of a micron.

In the standard lightwave package, the fiber is aligned with the component and fixed in place by soldering. (See, e.g., U.S. Pat. No. 4,296,998, issued to Dufft.) Such a package provides high mechanical stability which is usually adequate for most applications. However, some uses require that the alignment be maintained for 10-20 years, and field installation, temperature variations, and long-term creep over such periods make it difficult to maintain such stability.

It is, therefore, an object of the invention to provide a lightwave package which is capable of maintaining optical fiber alignment over long periods of time.

In the case of optical switches, it is necessary to move an optical fiber aligned with another fiber or component into alignment with one or more additional fibers or components. Various mechanical means have been suggested for achieving such movement. (See, e.g., U.S. patent application W. C. Young, Ser. No. 432,254, filed Oct. 1, 1982.) Whiel adequate, it would be desirable to provide alternative optical switching means which have a lower cost and higher accuracy.

It is therefore a further object of the invention to provide a device for moving optical fibers into alignment with optical components, including other optical fibers, in order to provide an optical switching function. Furthermore, in the assembly of components, such as lightwave components, it is often necessary to provide for extremely accurate placement of piece parts. For example, piece parts for an optical connector must be placed within a holding fixture with submicron accuracy.

Therefore, it is a further object of the invention to provide a device for moving and positioning of parts with high accuracy.

SUMMARY OF THE INVENTION

These and other objects are achieved in accordance with the invention which in one aspect is a lightwave component package comprising a lightwave component selected from the group consisting of light sources and detectors and an optical fiber nominally aligned with the lightwave component. Means are included for moving the fiber to provide repeated realignment of the fiber with the component when misalignment occurs between the fiber and component.

In accordance with a further aspect, the invention is a device for moving and positioning small elements. The device includes a piezoelectric body having opposite major surfaces including electrodes formed on both of said surfaces to that application of an electrical bias to said electrodes results in changes in at least one dimension of the body in the plane of the major surfaces. Supports are mounted on one of the major surfaces near the ends of the body, and means are provided for mounting the element to the assembly formed by the piezoelectric body and the supports. Means are also provided for selectively clamping the supports so that successive changes in the dimension of the body will result in movement of the body and support assembly in a plane parallel to the major surfaces.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

In one aspect, the present invention departs from the generally accepted view of packaging design which attempts to hold the fiber as stationary as possible to prevent misalignment when the component is in use. Rather, a dynamic, intelligent package is proposed where the fiber can be realigned whenever misalignment occurs.

Figure 1:
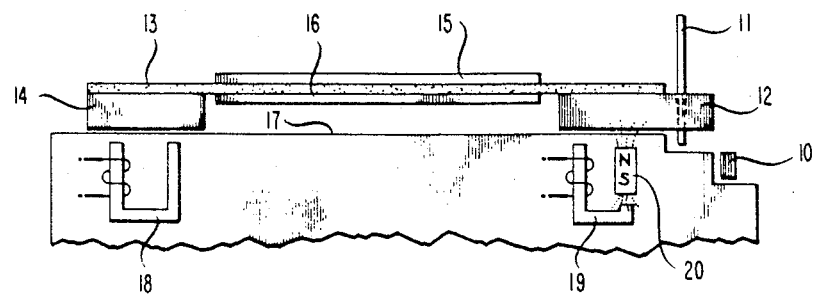
FIGS. 1, 2, and 3 are schematic illustrations of a portion of a package in accordance with one embodiment of the invention demonstrating the operation of the invention.
Figure 2:
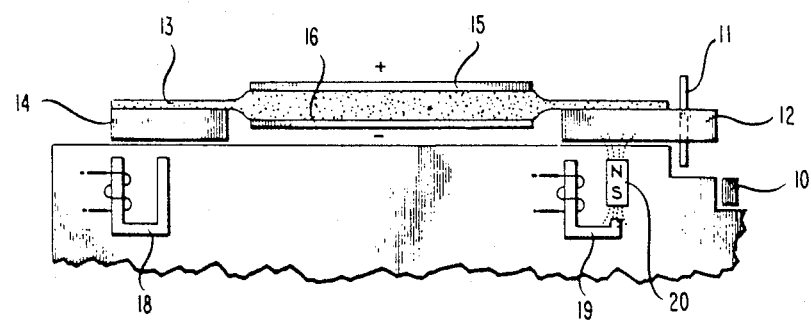
Figure 3:
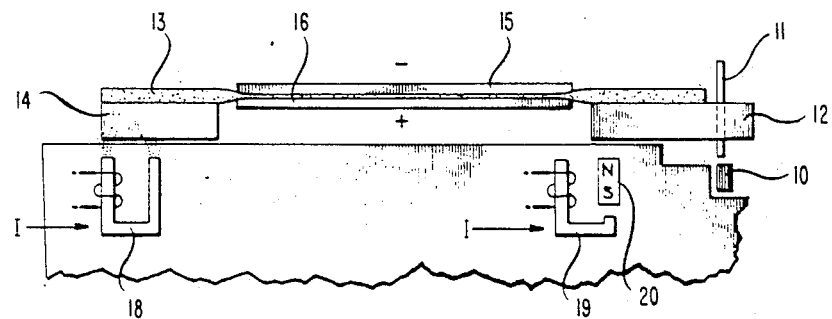

One embodiment useful in realigning the fiber in a package is illustrated schematically in FIGS. 1-3. The figures show a portion of a package in a plan view with a laser, 10, mounted in standard fashion to a copper stud (not shown). It will be appreciated that the device, 10, could be a detector and that the package includes the standard components of a transmitter, receiver, or transceiver which are omitted for the sake of clarity.

The fiber, 11, which is to be aligned is securely fitted through a hole in a support which, in this example, is a soft iron shunt, 12. This shunt is secured at one end of a major surface of a piezoelectric crystal, 13, which in this example is PZT. A similar support, 14, is secured to the other end of the crystal. Electrodes, 15 and 16, are included on the opposite major surfaces of the crystal, 13. The shunts, 12 and 14, are slidably engaged over the surface, 17, which is the surface of a rigid, nonferrous base such as brass or aluminum. The shunts are restrained from moving in a direction perpendicular to the page by guide pins (not shown) mounted in the surface, 17.

Electromagnets, 18 and 19, are each provided in close proximity to a corresponding shunt on the opposite side of the surface, 17. A permanent magnet, 20, comprising an iron bar is also provided in alignment with one electromagnet (19) and a corresponding shunt (12).

FIG. 1 illustrates the device in its quiescent state with the fiber, 11, out of alignment with the laser, 10, and the shunt, 12, clamped in position on surface, 17, by permanent magnet, 20. In order to provide proper alignment, a bias is supplied to electrodes, 15 and 16, on the piezoelectric crystal. As illustrated in FIG. 2, the crystal is such that a positive potential supplied to electrode, 15, causes expansion of the crystal in its thickness dimension. In this example, the bias was supplied by a standard dc power supply (not shown) with a magnitude of approximately 100 volts. The expansion of the crystal in the thickness dimension will cause contraction of the ends of the crystal. Since shunt, 12, is magnetically clamped to the surface, 17, the left end of the crystal, and shunt, 14, will move to the right by one step (i.e., a direction parallel to the major surfaces of the crystal). The magnitude of the step will, of course, be dependent upon factors such as the dimensions of the crystal, 13, and the magnitude of the potential applied to electrodes, 15 and 16. In this example, the step was a distance of approximately 0.05 micron. For most alignment purposes, the step should be in the range 0.01-1 micron.

As illustrated in FIG. 3, the left-hand portion of crystal, 13, and shunt, 14, can then be clamped by applying a current (I) to the coil of electromagnetic, 18. At the same time or shortly thereafter, the right-hand side of the crystal and shunt, 12, can be unclamped by applying the same current (I) to the coil of electromagnetic, 19, but in a direction which causes a magnetic flux opposite to that of permanent magnet, 20, thereby canceling the magnetic attraction of magnet, 20. In addition, the bias supplied to electrodes, 15 and 16, is reversed so that the positive potential is now applied to electrode, 16. This causes a contraction of the crystal, 13, in its thickness dimension, resulting in expansion of the unclamped (right) side of the crystal to move the shunt, 12, and the fiber mounted therein by one step to the right in a direction parallel to the major crystal surfaces. In this example, movement by a single step is shown to align the fiber, 11, to the laser, 10. In actual practice, movement by seveal steps may be required until alignment is achieved. It will also be appreciated that, if desired, the reversal of the polarity on the electrodes can be eliminated in the step shown in FIG. 3 and movement achieved simply by clamping shunt, 14, and unclamping shunt, 12, with the bias removed from the electrodes. Further, permanent magnet, 20, could be removed from the device and quiescent clamping of shunt, 12, provided instead by magnetization of the core of electromagnet, 19, by a suitable pulse of current.

It will be appreciated in view of the foregoing that a mechanism is provided to move a fiber in a series of discrete steps having a predetermined magnitude. The total distance traveled by the fiber is not limited to a single expansion or contraction of a piezoelectric element. Further, due to magnetic clamping action, no voltage need be applied to the device during the quiescent state to keep the fiber in the proper position.

Figure 5:
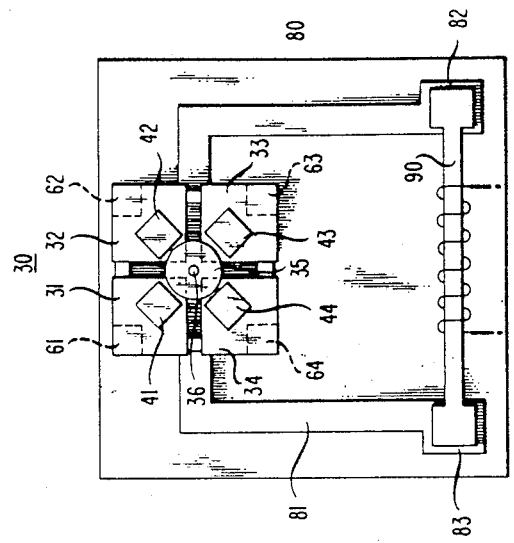
FIG. 5 is a plan view of a portion of a package in accordance with the same embodiment.
Figure 4:
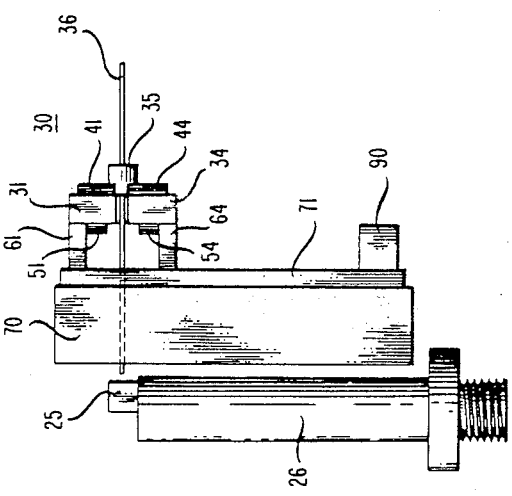
FIG. 4 is a side view of a portion of a package in accordance with a further embodiment of the invention.

FIGS. 1-3 illustrate means for moving a device in one dimension. In most applications, however, two-dimensional alignment is needed. Such movement can be achieved, according to the same principles, in an embodiment such as shown schematically in FIGS. 4-9. FIGS. 4 and 5 show side and plan views of the alignment means, which includes a piezoelectric crystal body, 30, formed by joining separate squares of PZT crystal, 31-34, utilizing an adhesive such as epoxy (not shown). The crystals are joined by applying the epoxy between a corner of the top surface of each cyrstal and a jewel, 35, which holds the optical fiber, 36. Each crystal, 31-34, includes an electrode formed on each major face, such as electrodes, 41, 51 and 44, 54, which are visible in FIG. 4. (Electrodes, 42 and 43, formed on one surface of crystals, 32 and 33, are also visible in FIG. 5.) Each crystal further includes a metal support 61-64, on one corner of the major surface of the crystals closest to laser, 25, and stud, 26. Specifically, the supports are provided so that the composite body, 30, has a support on each of the corners, as shown in phantom in FIG. 5. It should be appreciated that in most cases, it would be desirable to form the electrodes on the entire major surface of each crystal. The jewel, 35, and supports, 61-64, would then be attached to the electrodes by an appropriate adhesive such as epoxy. As long as the adhesive is nonconducting, the supports will be electrically isolated from the electrodes. Further, the adhesive will generally prevent the crystal from expanding or contracting in the area it is applied. Hence, FIGS. 4 and 5 represent an accurate schematic illustration whether the electrodes cover all or only a portion of the surface of the crystals.

Figure 6:
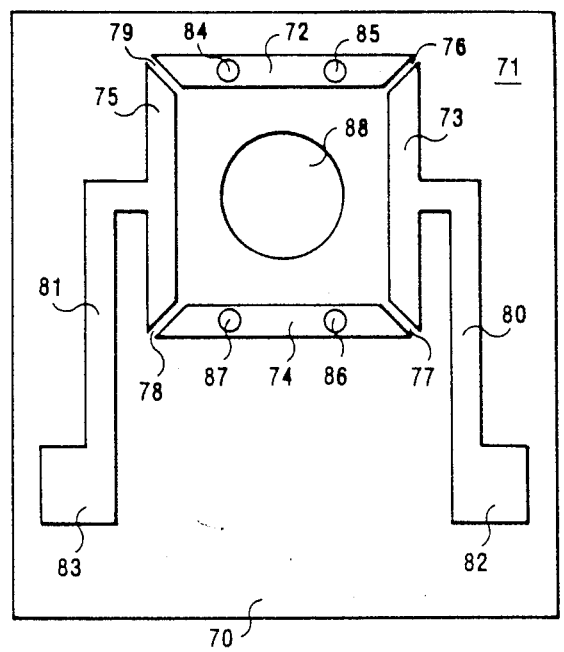
FIG. 6 is a plan view of a further portion of the package in accordance with the same embodiment.

The piezoelectric body, including the optical fiber embedded therein, is mounted to a substrate, 70, which is positioned adjacent to the laser mounting stud, 26. The substrate, 70, includes a patterned metal layer, 71, in this case steel, on one major surface. As shown in FIG. 6, which is a plan view of the substrate portion of the device without the piezoelectric assembly, the metal, 71, is patterned into bar segments, 72-75, with beveled ends so that the segments basically form a square with gaps, 76-79, at the corners. Two of the segments, 73 and 75, are provided with interconnect portions, 80 and 81, to bonding pads, 82 and 83, all formed fromt he same steel layer. The remaining two segments, 72 and 74, each include two holes, 84, 85 and 86, 87, extending completely through the segments and substrate to accommodate magnetic wires (not shown) for permanently magnetizing those segments. A hole, 88, is also provided through the substrate, 70, in the area confined by the segments so that the optical fiber may be positioned therethrough.

Returning to FIG. 5, it will be noted that the piezoelectric body-optical fiber assembly is mounted over the segments, 72-75, on substrate, 70, so that each support (61-64) bridges one of the gaps, 76-79, between the segments. The supports and gaps are of a size so that the bridges across segments will not be broken as the piezoelectric body-optical fiber assembly is moved. As also shown in FIG. 5, an electromagnet, 90, is mounted on the pads, 82 and 83.

Figure 7:
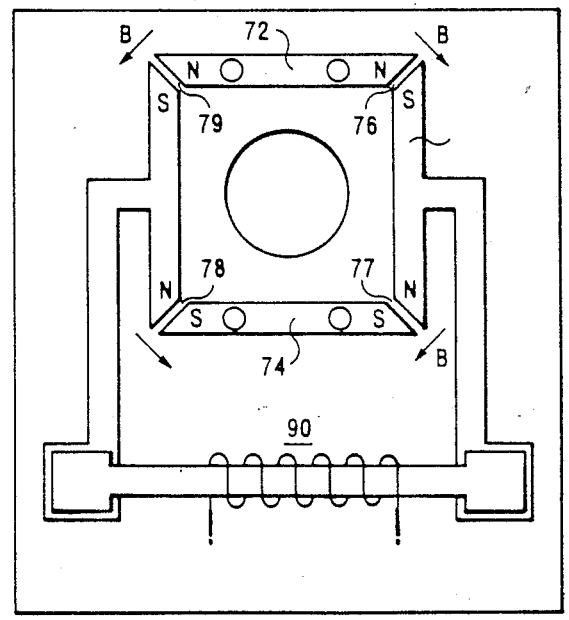
FIGS. 7, 8, and 9 are plan views of a further portion of the package shown in FIG. 5 illustrating a part of the operation of the invention in accordance with the same embodiment.

The operation of the device depicted n FIGS. 4-6 will now be described with further reference to FIGS. 7-9, which are plan views of the portion of the device depicted in FIG. 6, including electromagnet, 90, and illustrating varius magnetic fluxes through the segments, 72-75. In particular, FIG. 7 illustrates the quiescent state of the device with all four supports (61-64 of FIG. 5) clamped to their respective corners of the segments, 72-75. Due to the permanent magnet formed by magnetic wires (not shown) connecting segments, 72 and 74, the segment, 72, will always be a north (N) magnetic pole, and the segment, 74, will always be a south (S) magnetic pole. The segments, 73 and 75, in the quiescent state will each have one north and one south magnetic pole, as indicated in FIG. 7. The magnetic flux (B) is therefore as shown by the labeled arrows. Since a magnetic field exists across each gap, 76-79, the supports (61-64 of FIG. 5) will each be clamped to their respective corners, and the piezoelectric body remains essentially stationary.

Figure 8:
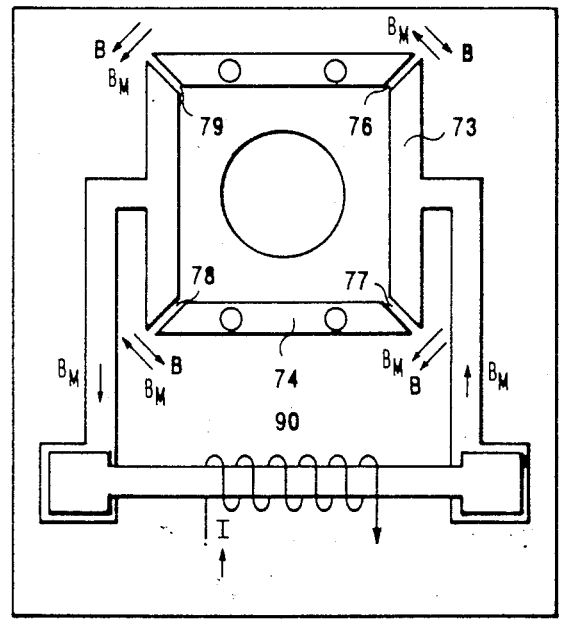
Figure 9:
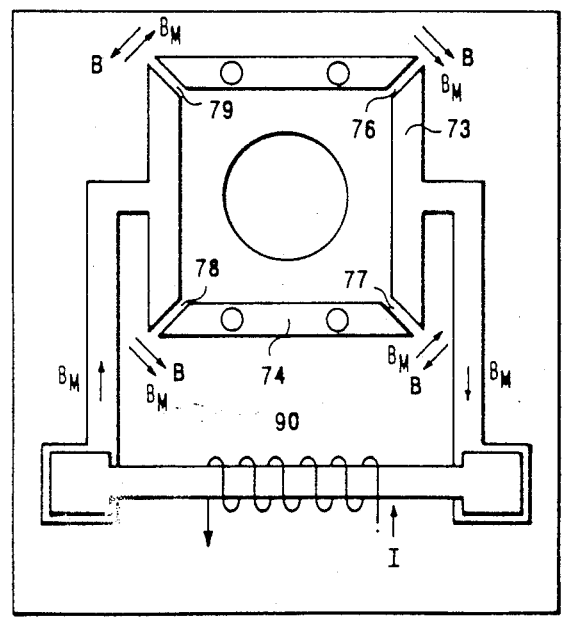

When it is desired, for example, to unclamp the supports (62 and 64) mounted over gaps, 76 and 78, a current, I, is sent through the coil of electromagnet, 90, in a first direction shown in FIG. 8. This current produces a magnetic flux, as represented by the arrow labeled $B_M$. The magnitude and direction of this flux (counterclockwise in FIG. 8) cancel out the flux, B, from the permanent magnet at gaps, 76 and 78, and reinforce the permanent magnet flux at gaps, 77 and 79. Thus, referring back to FIG. 5, the piezoelectric crystal-optical fiber assembly, 30, can now be moved in a diagonal direction between gaps, 76 and 78, by an appropriate potential applied to the electrodes on the surfaces of the crystal segments (31-34) in a manner to be described. Similarly, by applying current, I, to the coil of the electromagnet in the opposite direction, as shown in FIG. 9, the flux $B_M$ will have a magnitude and direction to cancel out the permanent flux, B, at gaps, 77 and 79, and reinforce the glux at gaps, 76 and 78. The fiber assembly can now be moved in the diagonal direction between gaps, 77 and 79.

Assuming that the situation in FIG. 8 is effected, reference is now made to FIG. 5 to describe how the piezoelectric body-optical fiber assembly may be moved. Potentials are applied to electrode pairs, 42, 52 and 44, 54, of bodies, 32 and 34, respectively. The potentials to the two bodies have an opposite polarity so that one body will expand in the diagonal direction and the other body will contract. It is assumed that the piezoelectric body is poled so that a positive potential is applied to electrode, 42, to cause expansion of body, 32, and a negative potential is applied to electrode, 44, to cause contraction of body, 34 (due to a decrease and increase of the thickness dimension of bodies, 32 and 34, respectively). The device is then returned to its quiescent state (FIG. 7) so that all four corners are again clamped. The situation in FIG. 9 is then effected so that supports, 61 and 63, in FIG. 5 are unclamped. The polarity applied to the electrodes on bodies, 32 and 34, is then reversed so that a negative potential is applied to electrode, 42, and a positive potential applied to electrode, 44. This causes a contraction of body, 32, and an expansion of body, 34, in the diagonal direction. Since these bodies are now clamped at the corners, this reversal of polarity results in bodies, 31 and 33, along with the optical fiber, being moved one step in the diagonal direction toward gap, 76. All four corners are again clamped (FIG. 7) and then supports, 62 and 64, are unclamped (FIG. 8). This is followed by removal of the bias supplied to the electrodes, 42, 52, and 44, 54, so that the bodies, 32 and 34, return to their original shape. The configuration can then be returned to its quiescent state or the procedure repeated to move the fiber an additional step toward gap, 76. Reversal of polarities previously described results in movement toward gap, 78. Further, a similar procedure can be followed to move the fiber in an orthogonal direction (toward gaps 77 or 79) by application of appropriate potentials to electrode pairs, 41, 51, and 43, 53, on bodies, 31 and 33.

Thus, the optical fiber, 36, mounted within the piezoelectric bodies can be moved in any number of discrete steps in orthogonal directions to achieve proper alignment. It will be noted that, while a plurality of square piezoelectric bodies comprise the assembly in this example, it is also possible to utilize a single body of four bar segments which form an "X" configuration, with each corner positioned over a gap, 76-79, and the fiber mounted in the middle of the configuration. In order to determine when the fiber is in or out of alignment, any number of standard detection means can be employed and so are not discussed here. (See, for example, U.S. Pat. No. 3,982,123, issued to Goell et al.)

In another embodiment of the invention, it is possible to provide electrostatic rather than magnetic clamping of the supports on the ends of the piezoelectric body. One embodiment of such a device is illustrated in the side view of FIG. 10. As in the FIG. 1 embodiment, this device includes supports, 100 and 101, at the ends of one major surface of a piezoelectric body, 102, with an optical fiber, 105, mounted in one of the supports. In this example, the supports are an electrically conducting or semiconducting material such as silicon doped to a concentration of $10^{16}$ cm$^{-3}$ with a standard n-type or p-type dopant. Again, electrodes, 103 and 104, are provided on the major surfaces of the piezoelectric body. Here, however, the piezoelectric body-optical fiber assembly is mounted over a body of semiconductor material, 106, which in this example is silicon. The silicon, which is of p-conductivity type, includes a surface region, 107, of p+ conductivity type which is typically doped to a concentration of $10^{16}$-$10^{19}$ cm$^{-3}$. A passivating layer, 108, such as $SiO_2$, and an additional insulating layer, 109, such as $Si_3N_4$, can be included on the surface of the semiconductor. Optical fibers, 110 and 111, are provided in wells etched in the silicon body up to the insulating layers. Windows, 112 and 113, are etched through the insulating layers, 108 and 109, and the surface region, 107, in the areas over fibers, 110 and 111.

In this particular example, an optical switch is formed whereby light from fiber, 105, can be switched between fibers, 110 and 111, by application of appropriate electrical potentials to electrodes, 103 and 104. The device of FIG. 10 operates in essentially the same way as the device of FIGS. 1-3, except clamping and unclamping of the supports, 100 and 101, are accomplished by selectively applying electrical potentials between the supports and the conductive surface region, 107, in the silicon substrate. Whenever such a potential is applied to a support, that support will be clamped to the silicon body by electrostatic forces. Thus, the fiber, 105, can be moved in discrete steps from the area above fiber, 110, to the area above fiber, 111, or in the reverse direction. (Wires and biasing means are not shown in the figures for the sake of clarity in the drawings.)

Figure 10:
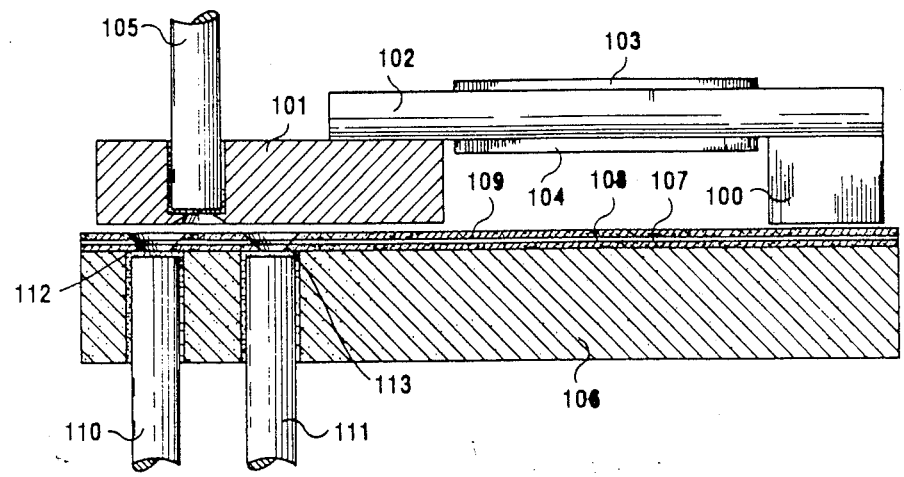
FIG. 10 is a side view of a portion of a package in accordance with a further embodiment of the invention.
Figure 11:
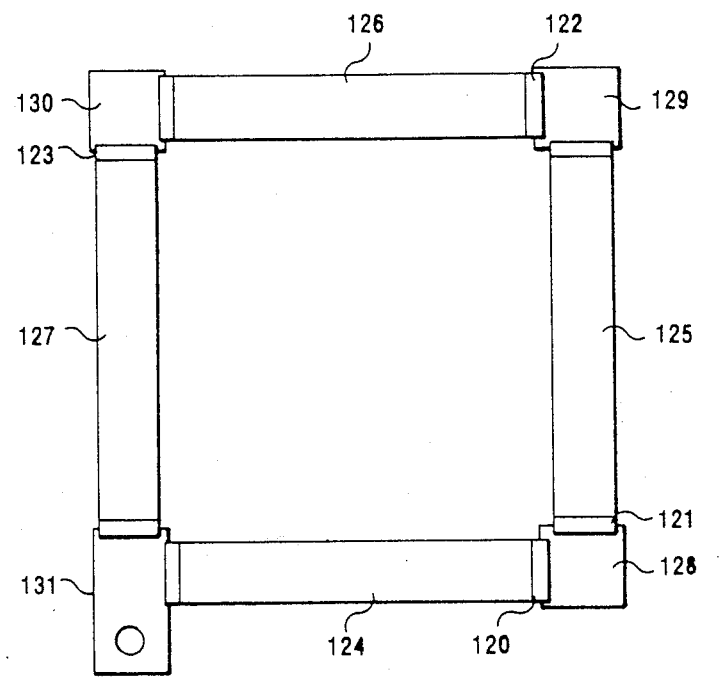
FIG. 11 is a plan view of a portion of a package in accordance with the same embodiment.

One-dimensional movement in FIG. 10 can be easily expanded to two-dimensional movement by a device such as shown in a plan view in FIG. 11. The device includes four piezoelectric bar segments, 120-123, which include electrodes on both major surfaces (only the top electrodes, 124-127, are visible). At each corner of the square formed by the four segments is a conductive support, 128-131, with an optical fiber mounted in one of the supports (131).

Horizontal motion of the device of FIG. 11 to the right can be achieved by clamping supports, 130 and 131, and applying an appropriate bias to the electrodes of bodies, 120 and 122, to expand them in the plane of their major surfaces. All four supports can then be clamped and then supports, 130 and 131, unclamped while the potentials to the electrodes on bodies, 120 and 122, are reversed so that the bodies now contract. The device can be moved to the left by clamping supports, 128 and 129, and expanding bodies, 120 and 122, followed by clamping all supports and unclamping supports, 128 and 129, while reversing the polarity to contract bodies, 120 and 122. Vertical motion in FIG. 11 can be achieved, similarly, by clamping and unclamping supports, 128 and 131, or 129 and 130, while expanding or contracting bodies, 121 and 123. Thus, the device can be made to move in discrete steps over any area of the silicon substrate (not shown in FIG. 11).

Although the devices illustrated in various embodiments herein have been described for use in aligning optical fibers, it should be appreciated that these devices may have aplication wherever accurate positioning of small elements is desired. For example, in the device of FIG. 10, the optical fiber may be replaced by a vacuum chuck positioned on one of the supports (101). This would allow the device to pick up and deposit small elements on some surface parallel to the semiconductor substrate, 106, when the device shown is rotated 90 or 180 degrees from the position shown.

Various additional modifications of the invention will become apparent to those skilled in the art. All such variations which basically rely on the teachings through which the invention has advanced the art are properly considered within the scope of the invention.

What is claimed is:

1. A lightwave component package comprising:
    a lightwave component selected from the group consisting of light sources and detectors;
    an optical fiber nominally aligned with the lightwave component; and
    means for moving the fiber to provide repeated realignment of the fiber with the component when misalignment occurs between the fiber and component, said means comprising:
    at least one piezoelectric body with electrodes formed on its opposite major surfaces to that application of an electrical bias to said electrodes results in movement of the body in a direction parallel to its major surfaces;
    supports attached to one major surface at the ends of said body and slidably mounted on a semiconductor body; and
    means for electrostatically clamping the ends of the body by application of an electrical bias to said supports.

2. A device for moving and positioning small elements comprising:
    a piezoelectric body having opposite major surfaces including electrodes formed on both of said surfaces so that application of an electrical bias to said electrodes results inc hanges in at least one dimension of the body in the plane of said major surfaces;
    supports mounted on one of said major s urfaces near the ends of said body;
    means for mounting the element to the assembly formed by the piezoelectric body and supports; and
    means for selectively clamping the supports to a semiconductor surface so that successive changes in the dimension of the body will result in movement of the body and support assembly in a plane parallel to the major surfaces over the said semiconductor surface, said means comprising supports made from a material selected fromt he group consisting of electrically conducting and semiconducting materials, and an electrically conducting surface region of a semiconductor body to which an electrical bias may be supplied so that the supports are clamped by electrostatic forces.

3. The device according to claim 2 wherein the element is an optical fiber.

4. The device according to claim 3 wherein the piezoelectric body comprises a plurality of piezoelectric elements with means for mounting the fiber at the center of the body and the suports are located at the ends of the elements opposite to the mounting means.

5. The device according to claim 4 wherein the piezoelectric elements each comprise squares with the means for mounting the fiber provided at adjacent corners of the square elements.

6. The device according to claim 2 wherein the piezolectric body comprises a plurality of piezoelectric bar elements arranged in a rectangular configuration with the supports at the corners of the configuration and the means for mounting the element at one of the supports.

7. A device for moving and positioning small elements comprising:
    a piezoelectric body having opposite major surfaces, including electrodes formed on both of said surfaces so that application of an electrical bias to said electrodes results in changes in at least one dimension of the body in the plane of said major surfaces;
    supports mounted on one of said major surfaces near the ends of said body;
    means for mounting the element to the assembly formed by the piezoelectric body and supports; and
    means for selectively clamping the supports to another surface so that successive changes in the dimension of the body will result in movement of the body and support assembly in a plane parallel to the major surfaces over the said another surface, said means comprising four magnetic bar segments arranted in a rectangular configuration in said another surface with the supports positioned at the gaps between the bar segments.

* * * * *